United States Patent
Lee et al.

(10) Patent No.: US 7,797,275 B2
(45) Date of Patent: Sep. 14, 2010

(54) SYSTEM AND METHOD OF TIME-BASED CACHE COHERENCY MAINTENANCE IN USER FILE MANAGER OF OBJECT-BASED STORAGE SYSTEM

(75) Inventors: Sang Min Lee, Daejeon (KR); Young Kyun Kim, Daejeon (KR); June Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 230 days.

(21) Appl. No.: 11/634,275

(22) Filed: Dec. 5, 2006

(65) Prior Publication Data
US 2007/0143340 A1    Jun. 21, 2007

(30) Foreign Application Priority Data
Dec. 8, 2005    (KR)    ...................... 10-2005-0119273
May 30, 2006    (KR)    ...................... 10-2006-0049023

(51) Int. Cl.
*G06F 7/00*    (2006.01)
(52) U.S. Cl. ........................ 707/618; 707/704; 707/955
(58) Field of Classification Search ................. 707/618
See application file for complete search history.

(56) References Cited

U.S. PATENT DOCUMENTS

| 2002/0078244 | A1* | 6/2002 | Howard ...................... 709/248 |
| 2002/0120710 | A1* | 8/2002 | Chintalapati et al. ........ 709/216 |
| 2003/0149843 | A1* | 8/2003 | Jarvis et al. ................. 711/133 |
| 2005/0165828 | A1  | 7/2005 | Lango et al. |
| 2007/0226320 | A1* | 9/2007 | Hager et al. ................. 709/219 |

FOREIGN PATENT DOCUMENTS

JP    2004-334434    11/2004

* cited by examiner

*Primary Examiner*—Neveen Abel Jalil
*Assistant Examiner*—Kellye D Buckingham
(74) *Attorney, Agent, or Firm*—Ladas & Parry LLP

(57) ABSTRACT

A cache coherency maintenance system and method of a user file manager in an object-based storage system are provided. According to the cache coherence maintenance system and method, by maintaining the coherency of a writeback cache based on time using a timer, metadata and data information are efficiently managed. Accordingly, even when accesses by users increase, the cost of maintaining the coherency of the cache is distributed to respective user file managers. In this way the performance of the entire object-based storage system is enhanced and the consistency and efficiency of information increase.

20 Claims, 10 Drawing Sheets

SYSTEM AND METHOD OF TIME-BASED CACHE COHERENCY MAINTENANCE IN USER FILE MANAGER OF OBJECT-BASED STORAGE SYSTEM

CROSS-REFERENCE TO RELATED PATENT APPLICATIONS

This application claims the benefits of Korean Patent Application No. 10-2005-0119273, filed on Dec. 8, 2005, and Korean Patent Application No. 10-2006-0049023, filed on May 30, 2006, in the Korean Intellectual Property Office, the disclosures of which are incorporated herein in their entirety by reference.

BACKGROUND OF THE INVENTION

1. Field of the Invention

The present invention relates to a system and method of maintaining cache coherency in an object-based storage system, and more particularly, to a system and method by which cache coherency in a file manager is maintained by applying a dirty cache based on time in each user file manager and updating information from an object-based storage system.

2. Description of the Related Art

Current storage technology has a variety of problems. One of these is that it is very difficult to manage and use information in storage dispersed over many places, due to the heterogeneous IT environments of typical companies. A direct attached storage (DAS) technology has been used for a long time, but due to its distance restriction and limited scalability and connectivity, this technology is used only in limited applications that require high speed data transmission.

Recently, network attached storage (NAS) and storage area network (SAN) technology have been replacing DAS. NAS and SAN allow storage to be shared through connection networks, such as Ethernet and fiber channel networks. However, these technologies also have unsolved problems with security, scalability, and file sharing between heterogeneous platforms. Accordingly, new object-based storage technology has been developed to provide storage abstraction based on objects and solve the problems of conventional storage technology.

An object in object storage technology is a storage container having an interface similar to a file system, and is composed of 3 elements: data (data stored by a user in storage), a user access attribute, and device management metadata (additional information maintained in a storage device in order to manage physical storage of the object). Dependency between a file system and metadata is removed in this object, and thus data can be shared between different file systems. Since objects can be treated individually, object-based storage provides data sharing independent of platform and a data security policy at an application level. By using the attribute of an object stored in an object-based storage device (OSD), an intelligent device function, such as self-management, can be additionally provided.

Meanwhile, in the past, in order to improve the performance of a central server, ordinary cache coherence maintenance service was performed using a middleware program in a cluster form in systems having tens of high-performance central processing units (CPUs). Another method is to use a dedicated independent cache server for a predetermined service of an object (for example, a high-capacity multimedia object) and thus enable an efficient file service. However, since this method uses a storage structure optimized for a predetermined service file, it cannot support a variety of file types and therefore provides a low-level support for general-purpose applications. Also, in order to maintain cache coherency of a user file manager, conventional object storage systems usually use a central lock server in a metadata management server, and thus the network bandwidth and processing capability of the server determine the overall performance of an object-based storage system.

Accordingly, the maximum number of users that one object-based storage system can accommodate depends on the maximum processing capability of the central lock server. In order to solve these problems, in the present invention, processing of cache coherency is distributed to each user file manager and thus a smooth object-based file service can be provided regardless of the number of users.

U.S. Patent Application No. 20050165828, by Jason Lango and 4 other persons, filed by Network Appliance Inc. on Oct. 14, 2004, and laid open on Jul. 28, 2005, relates to a method of quickly and efficiently transmitting media data to users by using an independent cache server, and a system therefor. The method requires a separate cache server and thus requires additional cost. Also, since the object data of the caching is limited to a special purpose file, the method is not suitable for a high-capacity object system. In addition, the more users accessing the system, the greater the capacity required for the cache server.

SUMMARY OF THE INVENTION

The present invention provides a cache coherence maintaining system of an object-based storage system, which regards a cache as valid for only a predetermined time by using cached metadata and cache load time information of data, allowing a user file manager to individually maintain cache coherency on a time basis.

The present invention also provides a method of maintaining time-based cache coherency in a user file manager and processing a request when a dentry information request, a data request or a file lock request from a user is received.

According to an aspect of the present invention, there is provided a time-based cache coherence maintaining system in a file manager of an object-based storage system, the cache coherence maintaining system comprising: a writeback cache storing metadata and data; a timer recording a storing time in the writeback cache; a metadata cache controller fetching the metadata for which a predetermined time has passed in the writeback cache, from a metadata management server; and a data cache controller fetching the data for which a predetermined time has passed in the writeback cache, from an object-based storage device.

According to another aspect of the present invention, there is provided a time-based method of maintaining cache coherency of a file manager when dentry information is provided, the method comprising: receiving in an object-based storage system a request from a user for dentry information; if the requested dentry information does not exist in a cache, fetching the requested dentry information from a metadata management server, storing the information in the cache, and recording the storing time; if the requested dentry information exists in the cache, checking whether or not a predetermined time for the storing time of the dentry information existing in the cache has passed; and if the predetermined time has passed, receiving the requested dentry information from the metadata management server, updating the cache, and recording the update time.

According to another aspect of the present invention, there is provided a time-based method of maintaining cache coherency of a file manager when data is provided, the method comprising: receiving in an object-based storage system a request from a user for data; if the requested data does not exist in a data cache, fetching the requested data from an object-based storage device, storing the data in the data cache, and recording the storing time; if the requested data exists in the data cache, checking whether or not a predetermined time for the storing time of the data existing in the data cache has passed; and if the predetermined time has passed, receiving the requested data from the object-based storage device, updating the data cache, and recording the update time.

According to another aspect of the present invention, there is provided time-based method of maintaining cache coherency of a file manager when a file lock request is processed, the method comprising: receiving in an object-based storage system a file lock request from a user; if the metadata of the file requested for file lock is in a dirty state in a metadata cache, transmitting the metadata in the metadata cache to a metadata management server so that the metadata is applied to the metadata management server; if the data of the file requested for a file lock is in a dirty state in a data cache, transmitting the data in the data cache to an object-based storage device so that the data is applied to the object-based storage device; and after applying the metadata and data, invalidating all metadata in the metadata cache of the file requested for a file lock, and all data in the data cache of the file requested for a file lock.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
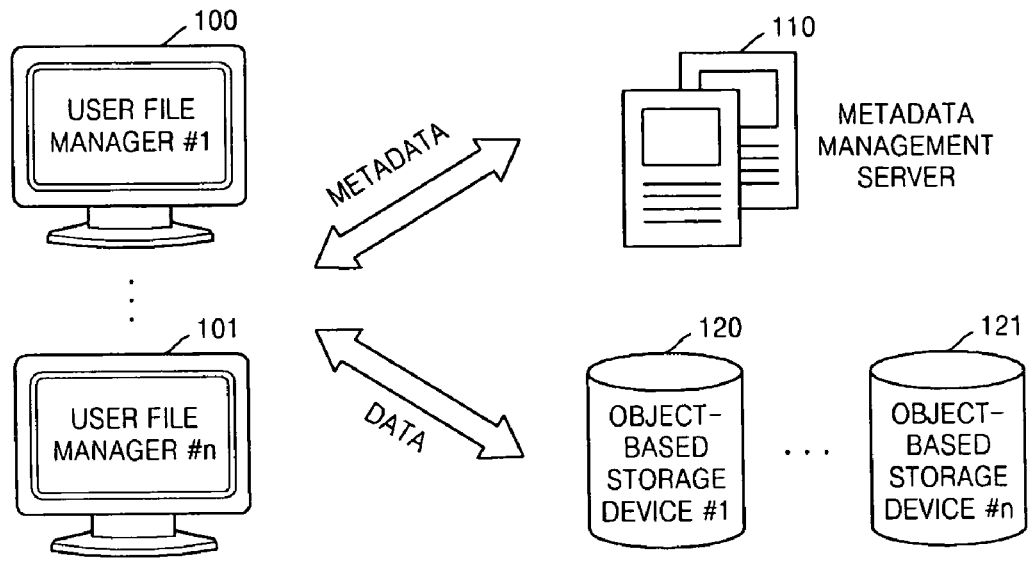
FIG. 1 is a diagram illustrating the general structure of an object-based storage system according to an embodiment of the present invention.

FIG. 1 is a diagram illustrating the general structure of an object-based storage system according to an embodiment of the present invention.

Referring to FIG. 1, the object-based storage system is composed of n user file managers 100 and 101, a metadata management server 110, and n' object-based storage devices 120 and 121.

If a file-related request (dentry information request, data request, and file lock request) from a user is received, the user file manager 100 and 101 requests metadata from the metadata management server 110, and data of a file from the object-based storage devices 120 and 121. When the user file manager's request is received, the metadata management server 110, which manages structural information of a file formed of objects, examines the validity of the request and transmits the requested metadata to the user file manager 100 and 101 through a network. When the user file manager's request is received, the object-based storage device 120 and 121 transfers object data to the user file manager 100 and 101 in the same manner.

Figure 2:
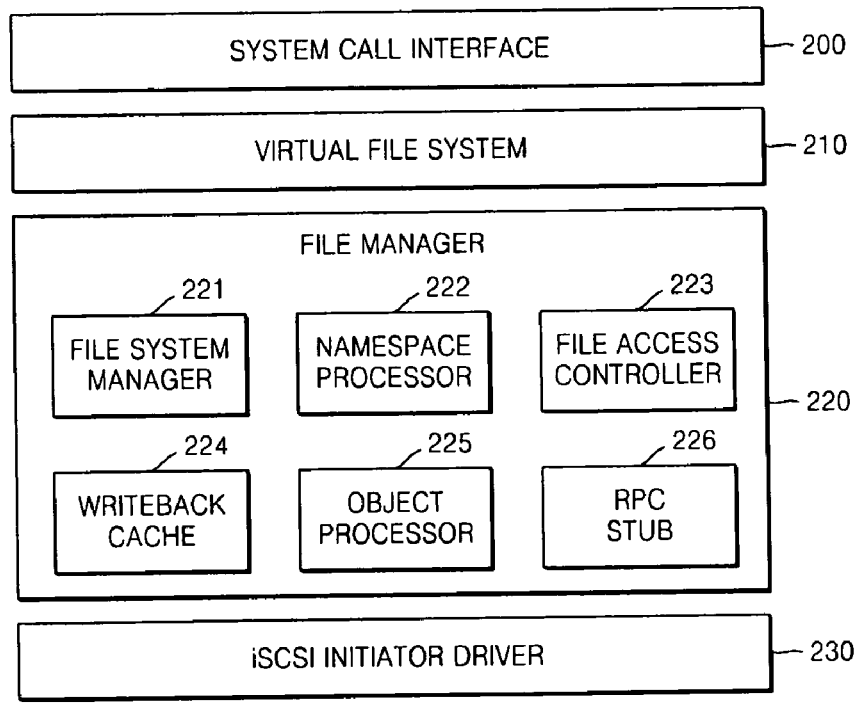
FIG. 2 is a diagram illustrating the internal structure of a user file manager according to an embodiment of the present invention.

FIG. 2 is a diagram illustrating the internal structure of a user file manager according to an embodiment of the present invention.

Referring to FIG. 2, a file system manger 221 provides a function for registering file system information in a virtual file system 210 in a kernel or revoking the registration. A namespace processor 222 provides namespace processing functions, such as generation, deletion of a file or directory, retrieval, and name change. An object processor 225 provides object processing functions, such as generation, deletion, input and output of objects forming a file, to an object-based storage device through a small computer system interface (SCSI) object-based storage device (OSD) command. A remote procedure call (RPC) stub 226 provides functions for accessing metadata information-managed in a metadata management server, through an RPC protocol. A file access controller 223 provides authentication for a user accessing a file, and access control. A cache 224 caches file metadata and data.

A change of cached data by a user is not immediately applied to the metadata management server or the object-based storage device, and is applied in a write-back method. That is, instead of immediately applying the change, the information of the change is applied to the metadata management server or the object-based storage device after a predetermined time. Also, each user file manager maintains the cache coherency of the metadata and file data of the cached file. Finally, an iSCSI initiator driver 230 transmits a SCSI OSC command, generated by the object processor 225, to the object-based storage device according to an Internet SCSI (iSCSI) protocol. In this way, data of a required file is fetched from the object-based storage device or is applied to the object-based storage device.

Figure 3:
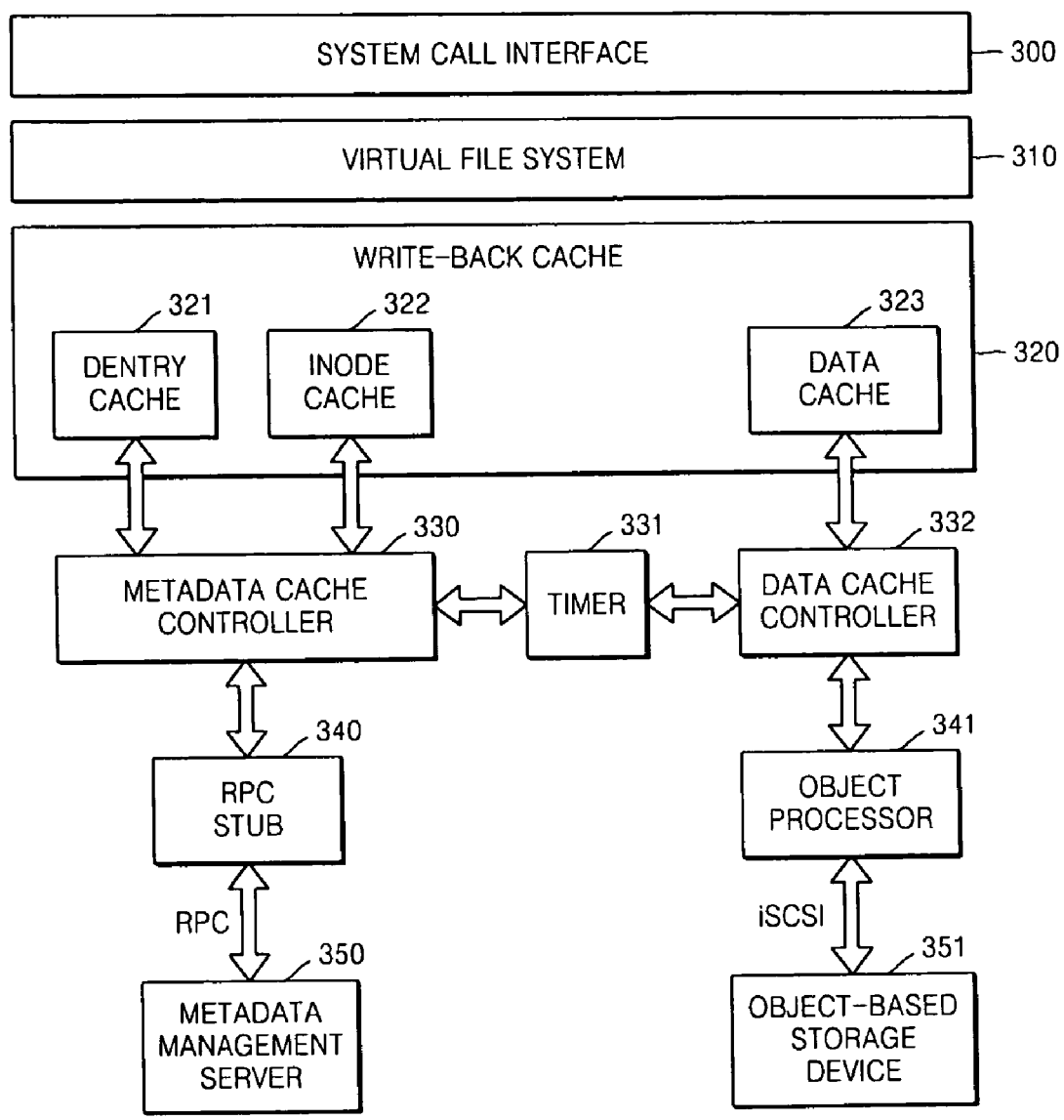
FIG. 3 is a diagram illustrating a cache coherency maintenance system in a file manager according to an embodiment of the present invention.

FIG. 3 is a diagram illustrating a cache coherency maintenance system in a file manager according to an embodiment of the present invention.

Referring to FIG. 3, a writeback cache 320 is composed of a dentry cache 321, an inode cache 322 caching metadata, and a data cache 323 caching data of a file. When cached metadata is invalidated, a metadata cache controller 330, which maintains the coherency of the metadata caches 321 and 322, reads new metadata from a metadata management server 350 through an RPC stub 340 interoperating with a timer 331. When data in data cache 323 expires, the data cache 323 receives new data from an object-based storage device 351 through an object processor 341 according to control by a data cache controller 332, and updates the contents of the data cache 323. In this way, the coherency of the data cache 323 is maintained.

A time-based method of maintaining cache coherency in a cache coherency system will now be explained briefly. When a file-related request from a user file manager is received, metadata caches 321 and 322 are searched first. If requested metadata is not in the metadata caches 321 and 322, the metadata is read from the metadata management server 350, and stored in the metadata caches 321 and 322, and the metadata cache load time is stored together. Likewise, the data cache 323 is searched for file data, and then if the file data is not in the data cache 323, the file data is read from the object-based storage device 351 and stored in the data cache 323, and the data cache load time is stored together. Next, when a user requests metadata, the metadata caches 321 and 322 are searched first. If the requested metadata is in the metadata caches 321 and 322, the metadata caches 321 and 322 are in an uptodate state (a valid state), and the metadata cache load time is greater than a predetermined time, the metadata data is invalidated and metadata is read again from the metadata management server 350.

Also, when the user requests data, the data cache 323 is searched, and if the requested data exists, the state of the data cache 323 is examined. If the data cache 323 is in an uptodate state, not in a locked state, and the cache load time exceeds a predetermined time interval, the data cache 323 is invalidated. The invalidated cache 323 again reads data from the object-based storage device 351 and provides the read data to the user. Finally, when the user requests a file lock, accurate cache coherency must be maintained, unlike the loose maintenance of cache coherency described above. Accordingly, the metadata and data of a file desired to be read- or write-locked, in a dirty state are applied respectively to the metadata management server 350 and the object-based storage device 351, and all metadata and data of the file in caches 321, 322, and 323 are invalidated, and then the file lock request is processed. This will be explained below with reference to FIG. 4.

Figure 4:
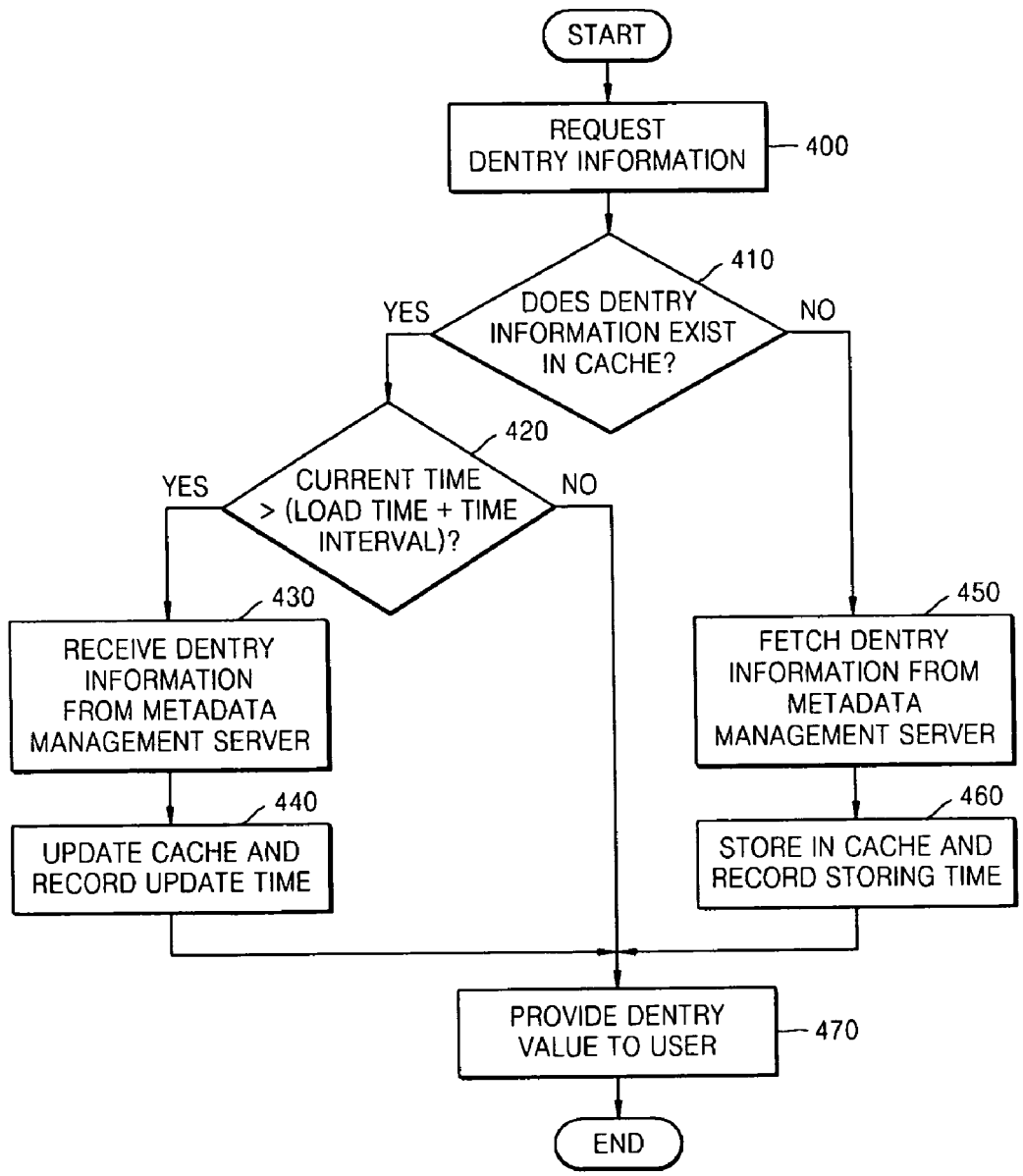
FIG. 4 is a flowchart illustrating a time-based method of maintaining cache coherency of a file manager when dentry information is provided according to an embodiment of the present invention.

FIG. 4 is a flowchart illustrating a time-based method of maintaining cache coherency of a file manager when dentry information is provided according to an embodiment of the present invention.

Dentry indicates a directory entry, and is metadata storing information on a connection between a directory item and a file corresponding to the directory item. Also, inode indicates an index node, and stores a variety of information items related to a file. A file has one inode corresponding to the file, and the inode has information on the location of the file on an actual disk, the type of the file, the attribute of the file, the owner of the file, a related group, a last modified time, and an access time.

Referring to FIG. 4, according to a user's request for dentry information in operation 400, it is examined whether or not the dentry information exists in a cache. If the dentry information does not exist in the cache, the dentry information is fetched from a metadata management server in operation 450 and stored in the cache, and the storing time is recorded in operation 460. If the dentry information exists in the cache in operation 410, and the time when the dentry information is stored in the cache is greater than a predetermined time in operation 420, new dentry information is received from the metadata management server in operation 430, the cache is updated, and the update time is recorded in operation 440. Then, the dentry value in the cache is provided to the user in operation 470.

Figure 5:
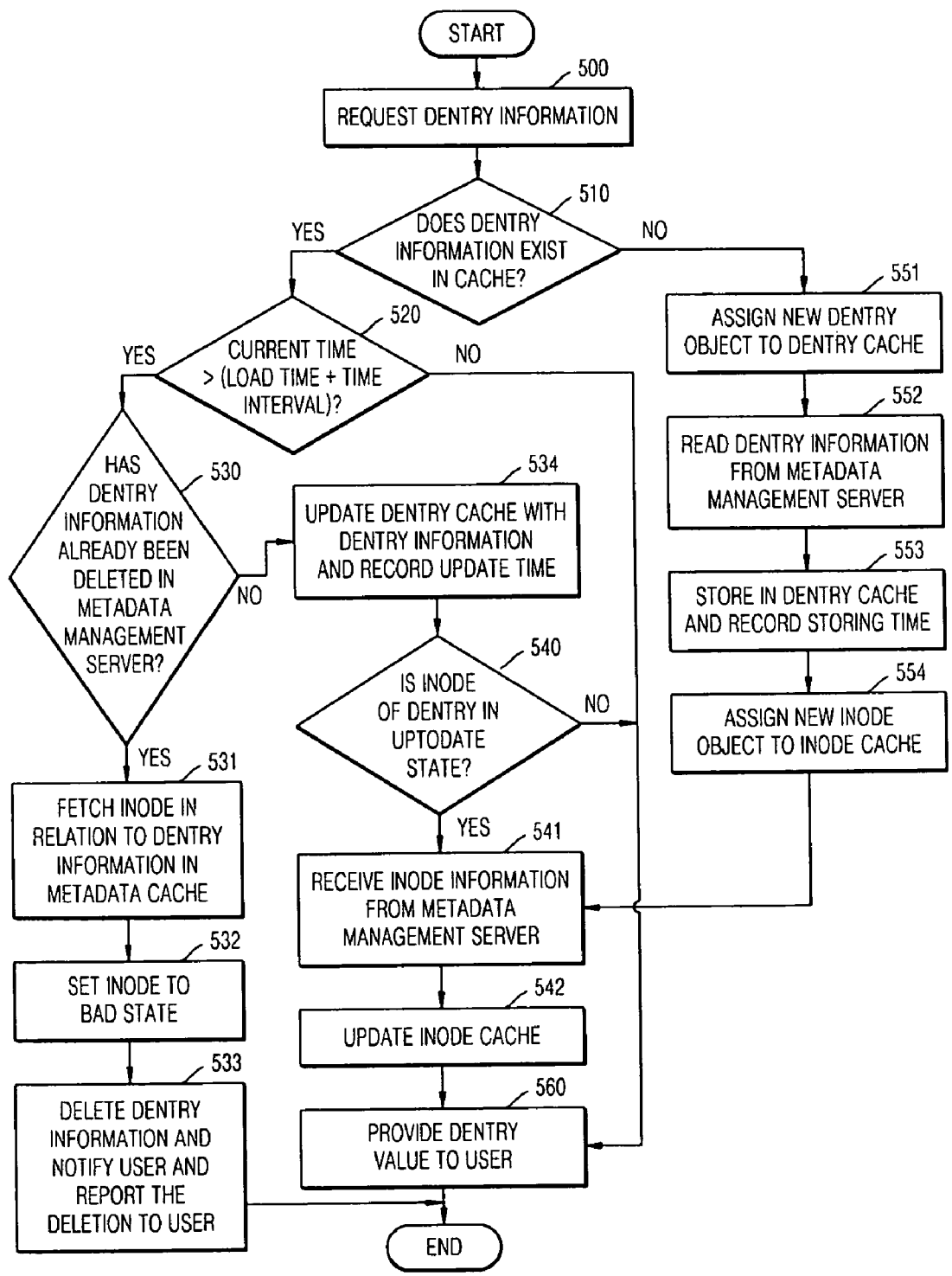
FIG. 5 is a flowchart illustrating a time-based method of maintaining cache coherency of a file manager using inode information when dentry information is provided according to an embodiment of the present invention.

FIG. 5 is a flowchart illustrating a time-based method of maintaining cache coherency of a file manager using inode information when dentry information is provided according to an embodiment of the present invention.

The time-based method of maintaining cache coherency of a file manager considering possible deletion of dentry information on a metadata management server and inode information will now be explained with reference to FIG. 5.

According to a user's request for dentry information in operation 500, a metadata cache controller first searches a dentry cache, and if the dentry information does exist in the cache in operation 510, the metadata cache controller allocates a memory space for new dentry information in the dentry cache in operation 551. Dentry information is received from the metadata management server in operation 552, and stored in the allocated memory space, and a current time value is received from a timer 331 and the storing time is recorded in operation 553. Since the cached dentry information should have the value of inode information relating to the dentry information, one new inode is assigned and connected to the dentry information in operation 554.

Then, the inode information is read from the metadata management server in operations 541 and 542.

If the dentry information requested by the user exists in the metadata cache in operation 510, the load time value of the cached dentry information is fetched. If the cache load time is greater than a predetermined time interval in operation 520, dentry information is again read from the metadata management server. If this dentry information has already been deleted by another user file manager in operation 530, the inode of the dentry information in the metadata cache of the file manager is fetched in operation 531. Then, the inode is set to be in a bad state in operation 532, the allocated dentry information is deleted, and the deletion is notified to the user in operation 533.

However, if the dentry information fetched from the metadata management server is not a deleted one in operation 530, the dentry information value and the dentry cache load time are updated in operation 534. If the inode information of the updated dentry information is in an uptodate state in operation 540, that is, not in a dirty state, a new inode information value is read from the metadata management server in operation 541, and the inode cache is updated with the inode information value in operation 542. However, if the inode information is not in an uptodate state in operation 540, inode information is not updated from the metadata management server, and the dentry information already existing in the dentry cache is provided to the user without change in operation 560.

Figure 6:
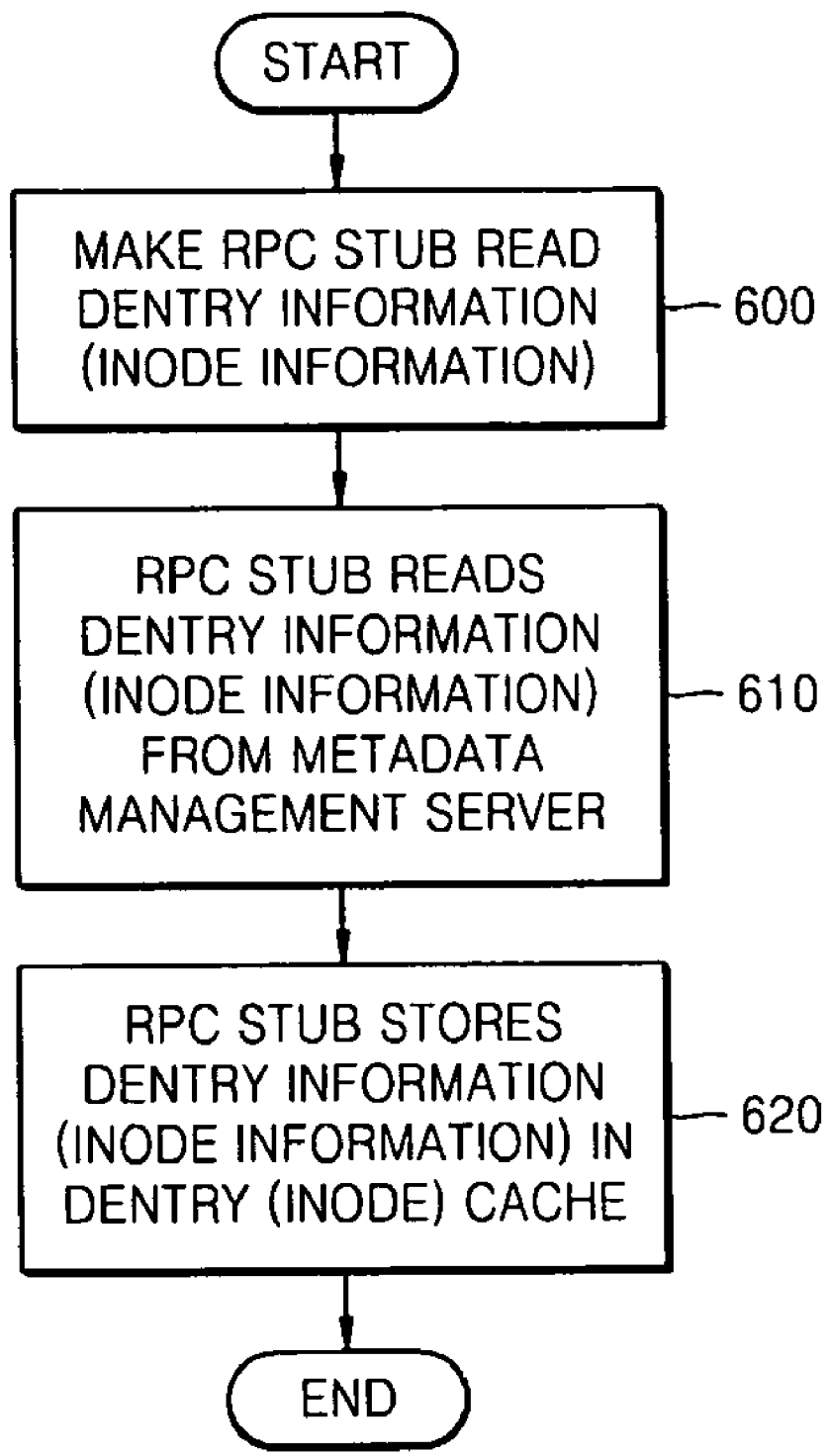
FIG. 6 is a flowchart illustrating a process illustrated in FIG. 5 in which a file manager receives dentry information from a metadata management server according to an embodiment of the present invention.

FIG. 6 is a flowchart illustrating a process illustrated in FIG. 5 in which the file manager receives dentry information from the metadata management server according to an embodiment of the present invention.

Referring to FIG. 6, the RPC stub 340 is requested to read dentry information requested by the user in operation 600.

The RPC stub 340 transforms the request into an RPC protocol format through a network and transfers the request to the metadata management server 350. Then, the metadata management server 350 receiving the request examines access rights, transforms the requested dentry information value into an RPC format, and transfers it to the RPC stub 340 of the user file manager requesting the dentry information in operation 610. The RPC stub 340 transforms the RPC formatted dentry information value into a data format that can be recognized by the user file manager, and loads the data in the dentry cache, in operation 620.

Figure 7:
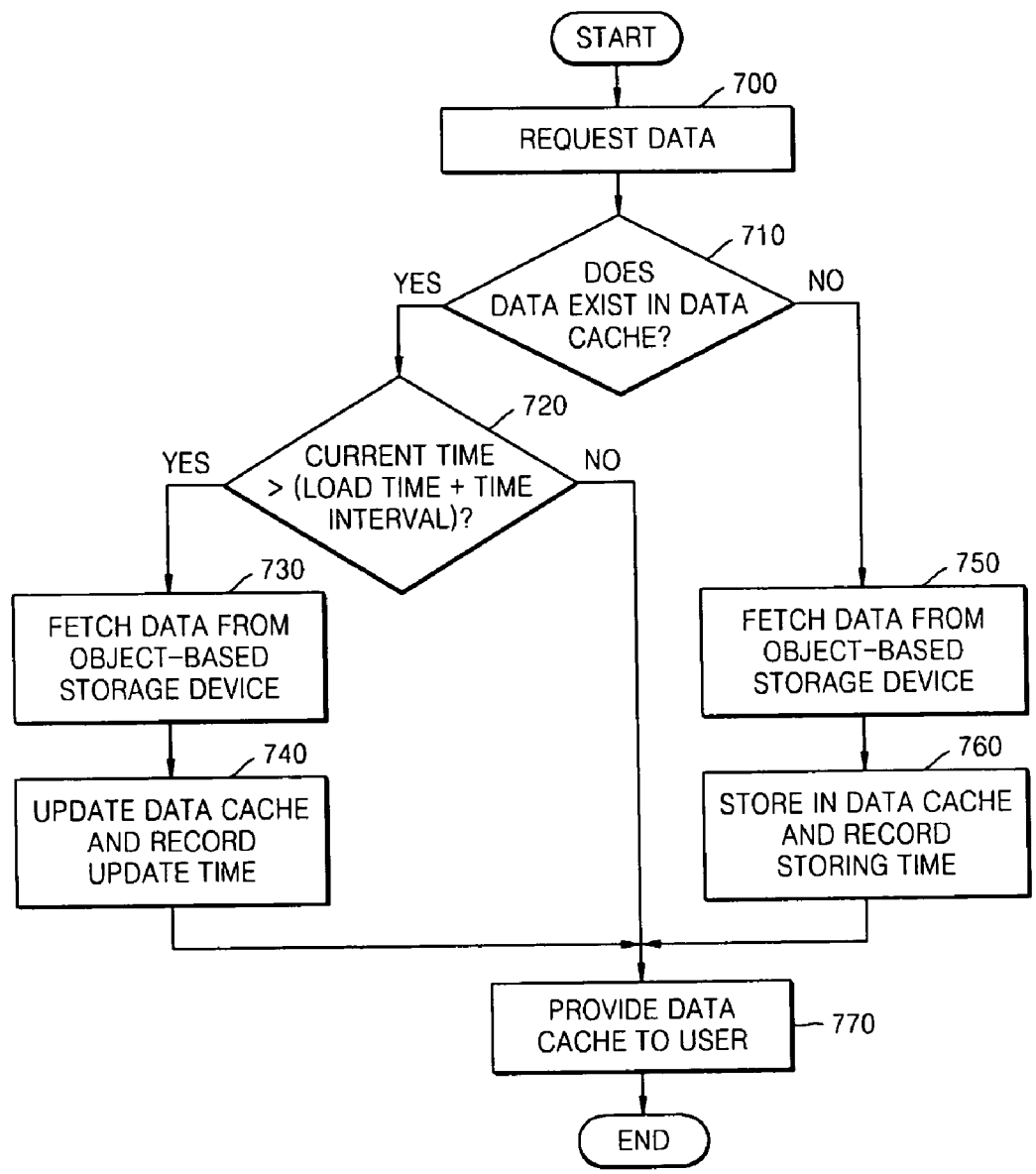
FIG. 7 is a flowchart illustrating a time-based method of maintaining cache coherency of a file manager when data is provided according to an embodiment of the present invention.

FIG. 7 is a flowchart illustrating a time-based method of maintaining cache coherency of a file manager when data is provided according to an embodiment of the present invention.

Referring to FIG. 7, when data is requested in operation 700, if the requested data exists in a data cache in operation 710, it is examined whether or not the load time of the data cache exceeds a predetermined time in operation 720. If the load time exceeds the predetermined time, new data is received from an object-based storage device in operation 730, the data cache is updated with the data, and the update time is recorded in operation 740. If the requested data does not exist in the data cache in operation 710, data is received from the object-based storage device in operation 750 and stored in the data cache, and the storing time is recorded in operation 760. Then, the data value in the data cache is provided to the user in operation 770.

Figure 8:
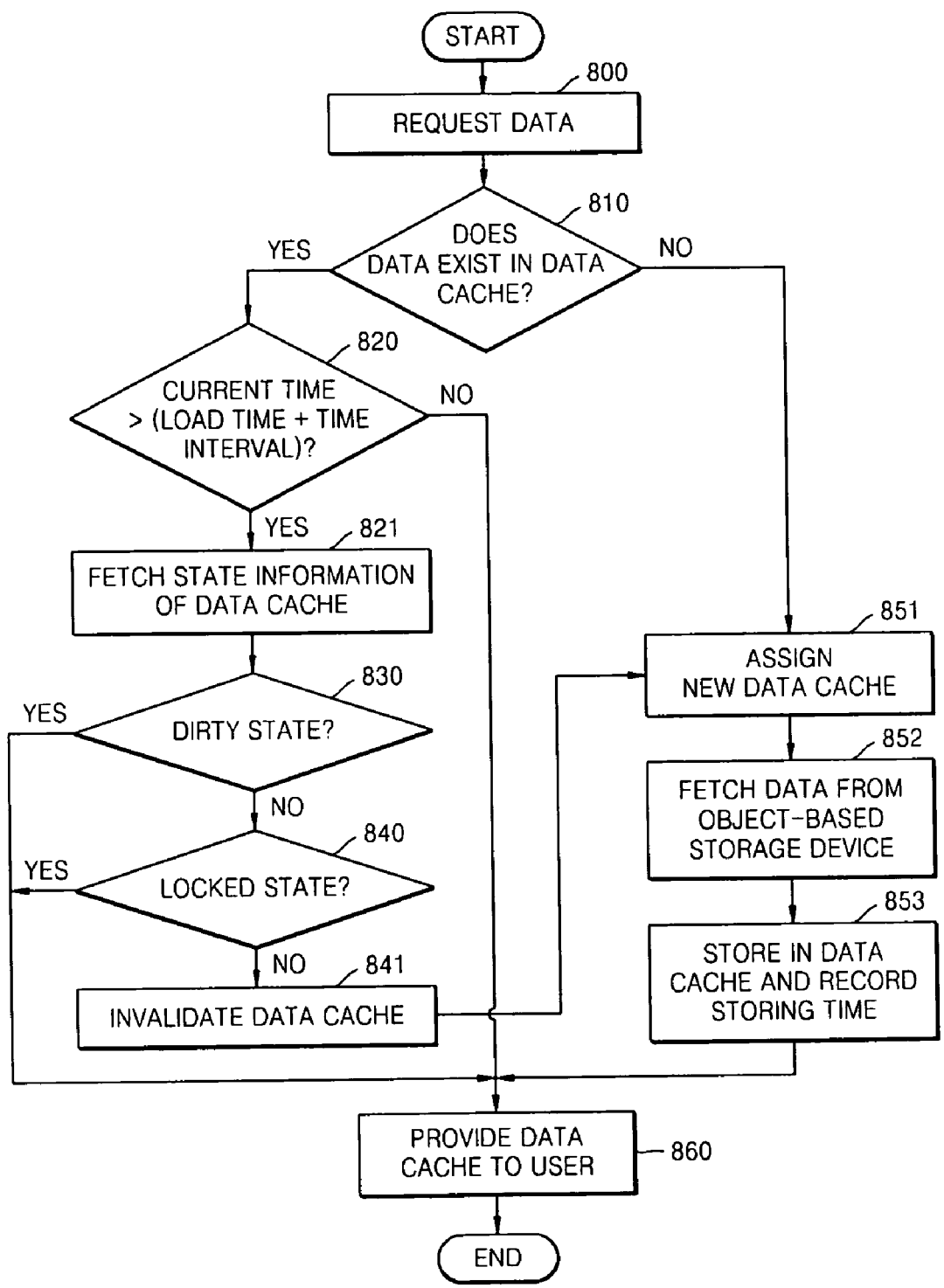
FIG. 8 is a flowchart illustrating a time-based method of maintaining cache coherency of a file manager according to the state information of a data cache when data is provided according to an embodiment of the present invention.

FIG. 8 is a flowchart illustrating a time-based method of maintaining cache coherency of a file manager according to the state information of a data cache when data is provided according to an embodiment of the present invention. The current embodiment is a time-based cache coherence method using state information (dirty, lock, etc.) of a data cache and will now be explained with reference to FIG. 8.

Referring to FIG. 8, when the user requests data in operation 800, the data cache is searched for the requested data, and if the requested data does not exist in the data cache in operation 810, a new data cache area is allocated in operation 851. Then, the requested data is fetched from an object-based storage device in operation 852, stored in the data cache and the storing time is recorded using a timer in operation 853. If the data requested by the user exists in the data cache in operation 810, then the load time of the data cache is fetched and if a current time obtained from the timer is not greater than the sum of the load time and a predetermined time interval in operation 820, the data value in the data cache is provided to the user in operation 860. If a current time obtained from the timer is greater than the sum of the load time and a predetermined time interval in operation 820, state information of the data cache is fetched in operation 821. If the state information indicates neither a dirty state in operation 830 nor a locked state in operation 840, the data cache is invalidated in operation 841. Then, the same process as performed when the requested data does not exist in the data cache from the beginning is performed in operations 851 through 860. If the cached data is in a dirty state or locked state, the file manager provides the data value existing in the data cache to the user in operation 860.

Figure 9:
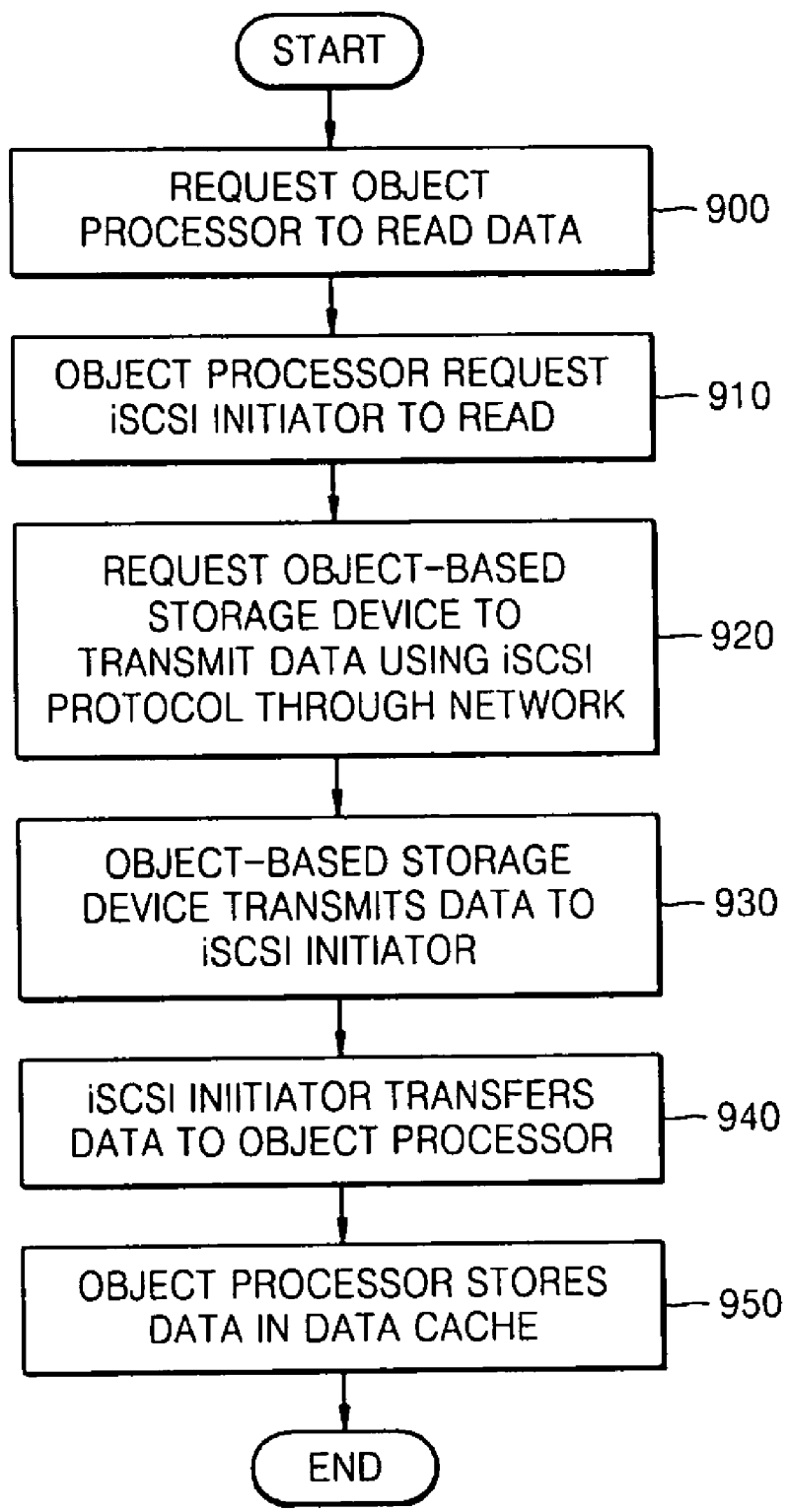
FIG. 9 is a flowchart illustrating a process illustrated in FIG. 8 in which a file manager receives data from an object storage device according to an embodiment of the present invention.

FIG. 9 is a flowchart illustrating a process illustrated in FIG. 8 in which the file manager receives data from the object storage device according to an embodiment of the present invention.

Referring to FIG. 9, if the object processor is requested to read data in operation 900, the object processor generates an iSCSI OSD command for reading the requested data in operation 910, and then an iSCSI initiator transmits the command to the object-based storage device 351 through a network according to the iSCSI protocol format. The object-based storage device 351 connected according to the iSCSI protocol interprets the iSCSI OSD command of the iSCSI initiator, and transmits the data area of the requested object in the iSCSI protocol format to the iSCSI initiator in operation 930. After waiting until the processing of the command of the iSCSI initiator is finished and the requested data is received in operation 940, the object processor stores the received data in the allocated data cache in operation 950.

Figure 10:
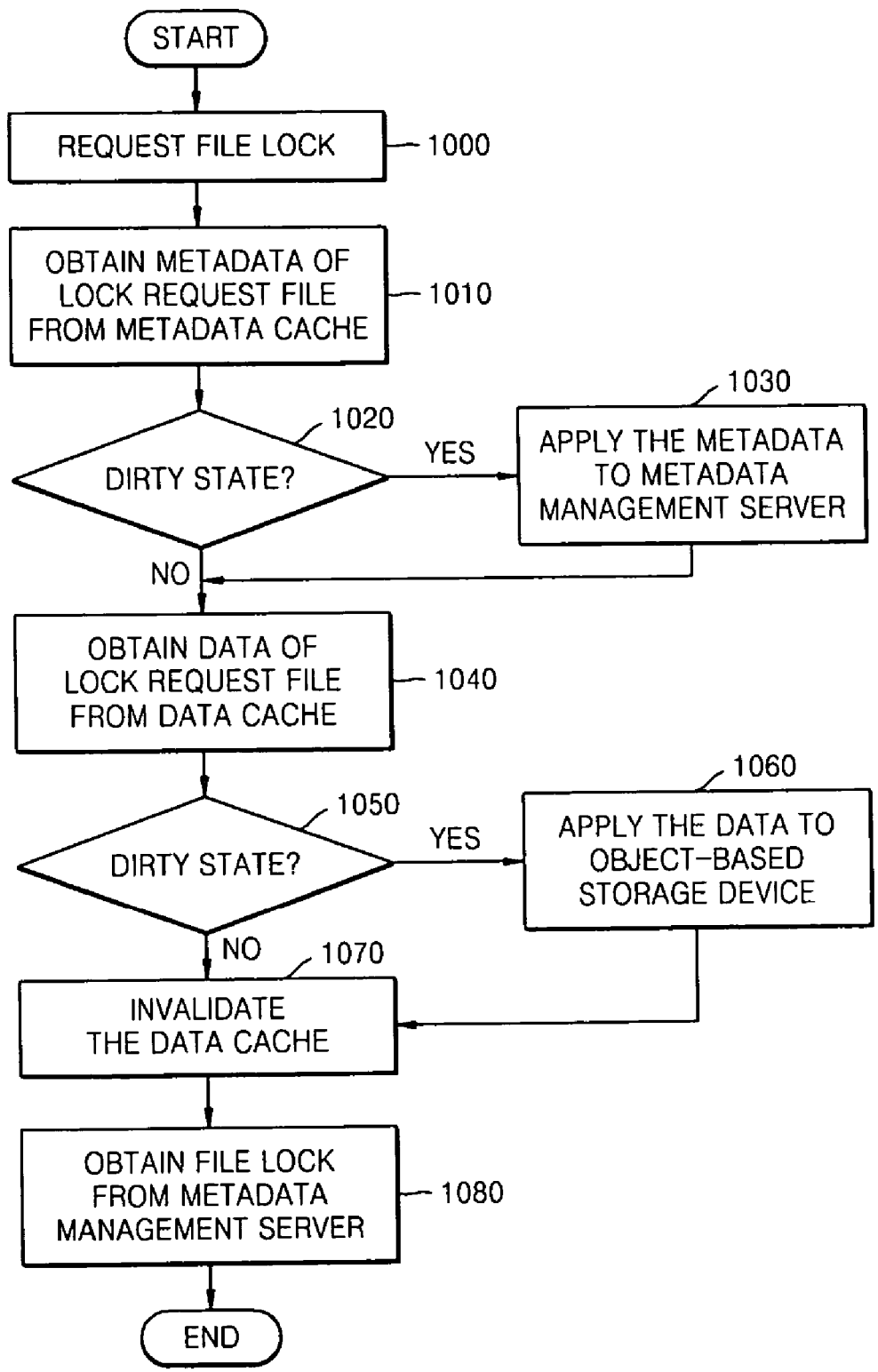
FIG. 10 is a flowchart illustrating a time-based method of maintaining cache coherency of a file manager when a file lock request is processed according to an embodiment of the present invention.

FIG. 10 is a flowchart illustrating a time-based method of maintaining cache coherency of a file manager when a file lock request is processed according to an embodiment of the present invention.

Since the file lock (of read or write) request of a user is a synchronization tool in relation to access among a plurality of clients (users), accurate cache synchronization is required. The processing of this file lock request will now be explained with reference to FIG. 10.

When a user requests a file lock in operation 1000, the metadata of the file requested for file lock is fetched from a metadata cache in operation 1010, and then if the metadata is in a dirty state in operation 1020, the metadata is applied to a metadata management server in operation 1030. Then, the data of the file requested for the file lock is fetched from the data cache in operation 1040, and if the data is in a dirty state in operation 1050, the data is applied to the object-based storage device in operation 1060, and the data cache is invalidated in operation 1070. However, if the data is not in a dirty state in operation 1050, the data cache is invalidated without applying the data. Then, the file lock is obtained from the metadata management server in operation 1080.

Figure 11:
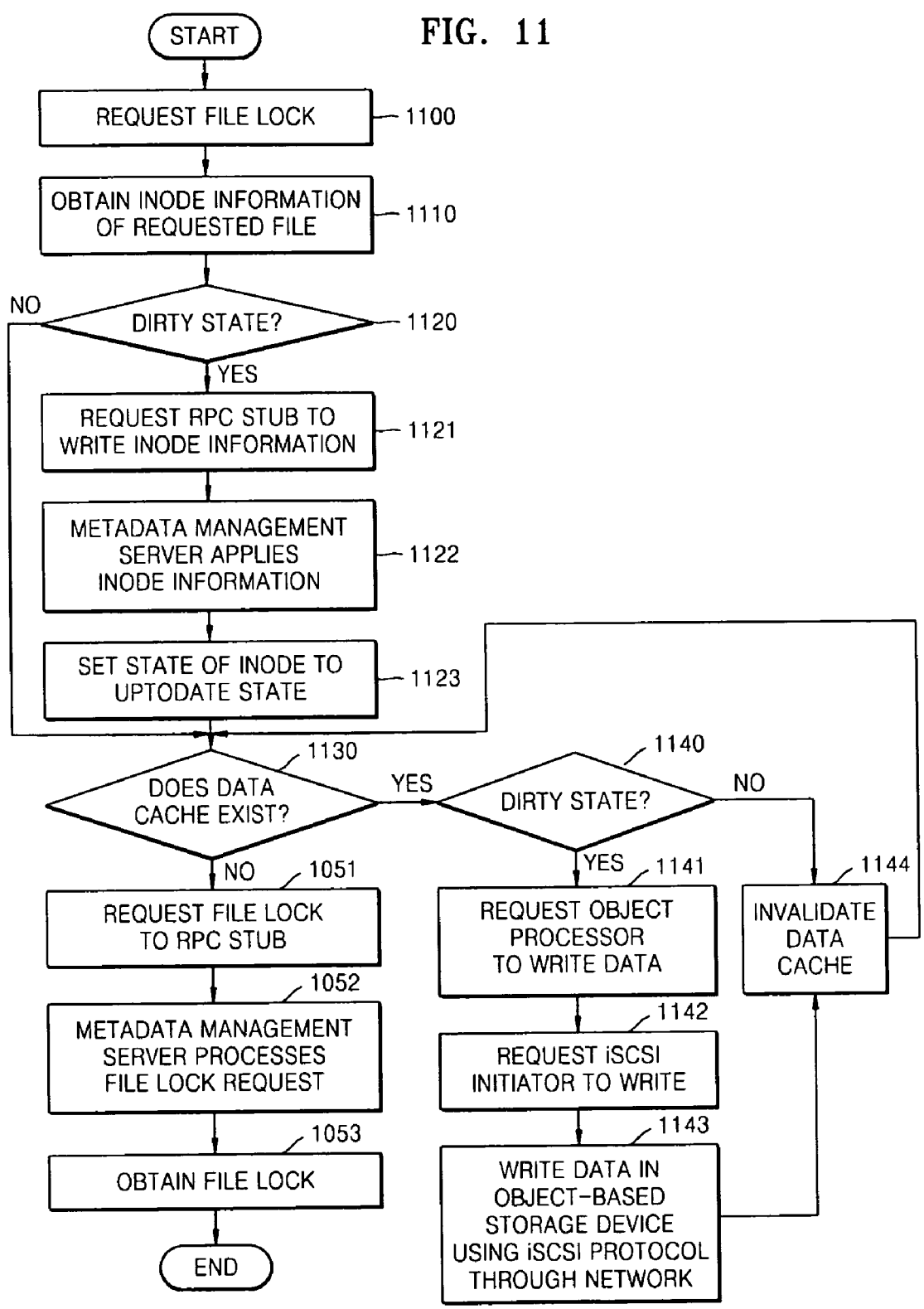
FIG. 11 is a flowchart illustrating a time-based method of maintaining cache coherency of a file manager using inode information when a file lock request is processed according to an embodiment of the present invention.

FIG. 11 is a flowchart illustrating a time-based method of maintaining cache coherency of a file manager using inode information when a file lock request is processed according to an embodiment of the present invention. The time-based method of maintaining cache coherency using inode information when a file lock request is processed will now be explained with reference to FIG. 11.

When the user requests file locking in operation 1100, the inode information value of the requested file is fetched in operation 1110, and the inode information value is processed according to the state in which the inode metadata is cached. If the inode information is in a dirty state in operation 1120, an RPC stub is requested to apply the inode information value in an inode cache to a metadata management server in operation 1121. According to the RPC stub's request, the metadata management server applies the inode information value that is in a dirty state in operation 1122. Then, if the update is successful, it is reported to the RPC stub of the user file manager. The RPC stub requests the file manager to change the state of the inode information to an uptodate state in operation 1123. However, if the cached inode information is not in a dirty state in operation 1120, a data update procedure is performed immediately in operations 1130 through 1053.

If the update of the metadata of the inode information is finished, updating of the data cache indicated by the inode information is performed. Until the data of the requested file is found using inode information, data caches are processed one by one according to the state of the data cache in operation 1130. If the state of the data cache is a dirty state in operation 1140, an object processor is requested to generate a SCSI OSD object write command so that the data cache can be updated in operation 1141. Then, the command and the data in a dirty state are transmitted to an iSCSI initiator so that the data can be applied to an object-based storage device in operation 1142. The object-based storage device requested by the iSCSI initiator updates the data in operation 1143. The data cache processed by the object-based storage device is invalidated in operation 1144 and thus, when file locking is performed, cache coherency can be maintained. If the data of the requested file is not found by the inode information any more in operation 1130, the metadata management server receives a file lock request through the RPC stub in operation 1051.

The metadata management server receiving the file lock request processes the request in operation 1052 and as a result, the user file manager obtains the file lock in operation 1053.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, when an object-based storage system is implemented, cache coherency is maintained on a time basis in user file managers not in a single central locking server. In this way, the performance of the entire object-based storage system can be improved and a high-performance storage system can be implemented at a relatively low cost.

Also, scalability is improved, since the load of maintaining coherency in each cache is not concentrated on a single server, allowing a high-performance object-based storage system capable of supporting a large number of users to be implemented without additionally expanding a metadata management server and object-based storage devices.

What is claimed is:

1. An object based storage system for maintaining cache coherence on a time basis in user file managers, the object based storage system comprising:
    a plurality of user file managers for obtaining, through a network, metadata and data from a metadata management server and an object-based storage device, the respective user file managers being associated with a processor and a memory for storing metadata and data, each of the individual user file mangers comprising:
        a writeback cache storing first metadata and first data, the metadata including structural information of the first data;
        a timer recording a time at which the first metadata and the first data are stored in the writeback cache;
        a metadata cache controller obtaining, through the network, new metadata from the metadata management server for replacing the first metadata when a current time at which the first data is requested is greater than the sum of the time recorded by the timer at which the first metadata is stored in the writeback cache and a predetermined time interval, and updating the writeback cache with the new metadata, such that the plurality of user file managers individually maintain cache coherency; and
    a data cache controller obtaining, through the network, new data from an object-based storage device for replacing the first data when a current time at which the first metadata is requested is greater than the sum of the time recorded by the timer at which the first data is stored in the writeback cache and a predetermined time interval, and updating the writeback cache with the new data, such that the plurality of user file managers individually maintain cache coherency.

2. The system of claim 1, wherein the writeback cache comprises a metadata cache and a data cache, and the metadata cache comprises a dentry cache storing dentry information and an inode cache storing inode information.

3. The system of claim 1, wherein if a file lock request of a user is received, the metadata cache controller applies the metadata in a dirty state of the file requested for the file lock existing in the metadata cache to the metadata management server, and the data cache controller applies the data in a dirty state of the file requested for the file lock existing in the data cache, to the object-based storage device.

4. A time-based method of maintaining cache coherency of a file manager of a plurality of file managers in an object-based storage system when dentry information is provided, the method comprising:
    receiving, by the file manager, a request from a user for dentry information, wherein the file manager includes a writeback cache which stores dentry information;
    if the requested dentry information does not exist in the writeback cache of the file manager of the plurality of file managers, receiving, by the file manager through a network, the requested dentry information from a metadata management server, storing the dentry information in the writeback cache, and recording the storing time at which the dentry information is stored in the writeback cache;
    if the requested dentry information exists in the writeback cache of the file manager, fetching the storing time and checking whether or not a current time at which the dentry information is requested is greater than the sum of the storing time at which the dentry information is stored in the writeback cache and a predetermined time interval; and
    if the current time is greater than the sum of the storing time at which the dentry information is stored in the writeback cache and the predetermined time interval, receiving, by the file manager through the network, new dentry information from the metadata management server, updating the writeback cache with the new dentry information, and recording the update time, such that the plurality of file mangers individually maintain cache coherency.

5. The method of claim 4, wherein in the receiving of the requested dentry information from the metadata management server, the updating of the cache, and the recording of the update time, if the requested dentry information is already deleted in the metadata management server, the dentry information already existing in the cache is deleted and the deletion is reported to the user.

6. The method of claim 4, wherein the receiving of the requested dentry information from the metadata management server, the updating of the cache, and the recording of the update time further comprises fetching from the metadata management server, inode information in relation to the dentry information stored in the cache and storing the inode information in the cache.

7. The method of claim 6, wherein the receiving of the requested dentry information from the metadata management server, the updating of the cache, and the recording of the update time further comprises, if the inode information in relation to the requested dentry information existing in the cache is in a valid state (uptodate state), receiving from the metadata management server, the inode information in relation to the requested dentry information, and updating the cache.

8. The method of claim 6, wherein the cache comprises a dentry cache and an inode cache and the dentry information is stored in the dentry cache and the inode information is stored in the inode cache.

9. The method of claim 4, wherein if the dentry information or the inode information is fetched from the metadata management server, the information is received through a remote procedure call (RPC) stub in the file manager.

10. A time-based method of maintaining cache coherency of a file manager of a plurality of file managers in an object-based storage system when data is provided, the method comprising:

receiving, by the file manager, a request from a user for data, wherein the file manager includes a writeback cach which stores data;

if the requested data does not exist in a writeback cache of the file manager of the plurality of file managers, receiving, by the file manager through a network the requested data from an object-based storage device, storing the data in the writeback cache, and recording the storing time at which the data is stored in the writeback cache;

if the requested data exists in the data cache of the file manager, fetching the storing time and checking whether or not a current time at which the data is requested is greater than the sum of the storing time at which the data is stored in the writeback cache and a predetermined time interval; and if the current time is greater than the sum of the storing time at which the data is stored in the writeback cache and the predetermined time interval, receiving, by the file manager through the network, new data from the object-based storage device, updating the writeback cache with the new data, and recording the update time, such that the plurality of file mangers individually maintain cache coherency.

11. The method of claim 10, wherein in the receiving of the requested data from the object-based storage device, the updating of the data cache, and the recording of the update time, if the predetermined time has passed and the data already existing in the data cache is in a dirty state or a locked state, the data cache is not updated.

12. The method of claim 10, wherein if the requested data is received from the object-based storage device, the data is received through an object processor and an Internet small computer system interface (iSCSI) initiator.

13. A time-based method of maintaining cache coherency of a file manager in an object-based storage system when a file lock request is processed, the method comprising:

receiving, by the file manager, a file lock request from a user, wherein the file manager includes a writeback cache that includes a data cache which stores data and a metadata cache which stores metadata including structural information of the data;

if the metadata of the file requested for file lock is in a dirty state in the metadata cache, transmitting the metadata in the metadata cache to a metadata management server so that the metadata is applied to the metadata management server;

if the data of the file requested for a file lock is in a dirty state in a data cache of the file manager, transmitting the data in the data cache to an object-based storage device so that the data is applied to the object-based storage device; and after applying the metadata and data, invalidating all metadata of the file requested for a file lock in the metadata cache of the file manager, and all data of the file requested for a file lock in the data cache of the file manager.

14. The method of claim 13, wherein in the transmitting of the metadata in the metadata cache to a metadata management server so that the metadata is applied to the metadata management server, after the metadata is applied, the state of the applied metadata is changed to an uptodate state.

15. The method of claim 13, wherein the metadata is inode information and the metadata cache is an inode cache.

16. The method of claim 13, wherein the data of the file requested for a file lock is fetched from the data cache by using the inode information of the file.

17. The method of claim 13, wherein in the receiving in an object-based storage system of the file lock request from a user, when the metadata is applied to the metadata management server, the metadata is applied through an RPC stub in the file manager, and in the transmitting of the metadata in the metadata cache to a metadata management server so that the metadata is applied to the metadata management server, when the data is applied to the object-based storage device, the data is applied through an object processor and an iSCSI initiator.

18. A computer readable recording medium having embodied thereon a computer program for executing a time-based method of maintaining cache coherency of a file manager of a plurality of file managers in an object-based storage system when dentry information is provided, the method comprising:

receiving, by the file manager, a request from a user for dentry information, wherein the file manager includes a writeback cache which stores dentry information;

if the requested dentry information does not exist in the writeback cache of the file manager of the plurality of file managers, receiving, by the file manager through a network, the requested dentry information from a metadata management server, storing the dentry information in the writeback cache, and recording the storing time at which the dentry information is stored in the writeback cache;

if the requested dentry information exists in the writeback cache of the file manager, fetching the storing time and checking whether or not a current time at which the dentry information is requested is greater than the sum of the storing time at which the dentry information is stored in the writeback cache and a predetermined time interval; and if the current time is greater than the sum of the storing time at which the dentry information is stored in the writeback cache and the predetermined time interval, receiving, by the file manager through the network, new dentry information from the metadata management server, updating the writeback cache with the new dentry information, and recording the update time, such that the plurality of file mangers individually maintain cache coherency.

19. A computer readable recording medium having embodied thereon a computer program for executing a time-based method of maintaining cache coherency of a file manager of a plurality of file managers in an object-based storage system when data is provided, the method comprising:

receiving, by the file manager, a request from a user for data, wherein the file manager includes a writeback cache which stores data;

if the requested data does not exist in a writeback cache of the file manager of the plurality of file managers, receiving, by the file manager through a network the requested data from an object-based storage device, storing the data in the writeback cache, and recording the storing time at which the data is stored in the writeback cache;

if the requested data exists in the data cache of the file manager, fetching the storing time and checking whether or not a current time at which the data is requested is greater than the sum of the storing time at which the data is stored in the writeback cache and a predetermined time interval; and if the current time is greater than the sum of the storing time at which the data is stored in the writeback cache and the predetermined time interval, receiving, by the file manager through the network, new data from the object-based storage device, updating the writeback cache with the new data, and recording the update time, such that the plurality of file mangers individually maintain cache coherency.

20. A computer readable recording medium having embodied thereon a computer program for executing A time-based method of maintaining cache coherency of a file manager in an object-based storage system when a file lock request is processed, the method comprising:

receiving, by the file manager, a file lock request from a user, wherein the file manager includes a writeback cache that includes a data cache which stores data and a metadata cache which stores metadata including structural information of the data;

if the metadata of the file requested for file lock is in a dirty state in the metadata cache, transmitting the metadata in the metadata cache to a metadata management server so that the metadata is applied to the metadata management server;

if the data of the file requested for a file lock is in a dirty state in a data cache of the file manager, transmitting the data in the data cache to an object-based storage device so that the data is applied to the object-based storage device; and after applying the metadata and data, invalidating all metadata of the file requested for a file lock in the metadata cache of the file manager, and all data of the file requested for a file lock in the data cache of the file manager.

* * * * *